(12) United States Patent
Enenkl et al.

(10) Patent No.: US 11,044,292 B2
(45) Date of Patent: Jun. 22, 2021

(54) APPARATUS AND METHOD FOR PLAYING BACK MEDIA CONTENT FROM MULTIPLE SOURCES

(71) Applicant: Sony Corporation, Tokyo (JP)

(72) Inventors: Michael Enenkl, Stuttgart (DE); Thomas Kemp, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 95 days.

(21) Appl. No.: 16/095,946

(22) PCT Filed: Apr. 25, 2017

(86) PCT No.: PCT/EP2017/059768
§ 371 (c)(1),
(2) Date: Oct. 24, 2018

(87) PCT Pub. No.: WO2017/186704
PCT Pub. Date: Nov. 2, 2017

(65) Prior Publication Data
US 2019/0158556 A1    May 23, 2019

(30) Foreign Application Priority Data

Apr. 27, 2016 (EP) .................. 16167364

(51) Int. Cl.
| | | |
|---|---|---|
| *H04L 29/06* | (2006.01) | |
| *H04H 20/24* | (2008.01) | |
| *H04H 60/12* | (2008.01) | |
| *H04H 20/26* | (2008.01) | |
| *H04H 60/11* | (2008.01) | |
| *G11B 27/10* | (2006.01) | |
| *G11B 27/34* | (2006.01) | |

(52) U.S. Cl.
CPC .......... *H04L 65/601* (2013.01); *G11B 27/102* (2013.01); *G11B 27/34* (2013.01); *H04H 20/24* (2013.01); *H04H 20/26* (2013.01); *H04H 60/11* (2013.01); *H04H 60/12* (2013.01); *H04L 65/4069* (2013.01)

(58) Field of Classification Search
CPC . H04H 20/24; H04L 65/4069; H04L 65/4076; H04L 65/601; H04N 21/00; H04N 21/40
See application file for complete search history.

(56) References Cited

U.S. PATENT DOCUMENTS

| | | | |
|---|---|---|---|
| 8,228,861 B1 * | 7/2012 | Nix ....................... | H04L 1/0009 370/329 |
| 9,224,105 B2 | 3/2015 | Cornelius et al. | |
| 9,215,268 B1 | 12/2015 | Wood et al. | |
| 9,264,666 B1 * | 2/2016 | Edelhaus .............. | H04L 65/403 |
| 2003/0084459 A1 * | 5/2003 | Buxton .................. | G06F 16/40 725/135 |

(Continued)

OTHER PUBLICATIONS

International Search Report and Written Opinion for International Application No. PCT/EP2017/059768 dated Jul. 17, 2017.

*Primary Examiner* — Jeong S Park
(74) *Attorney, Agent, or Firm* — Xsensus LLP

(57) ABSTRACT

An apparatus is provided which has a receiver configured to receive a media stream from a broadcast source and a circuitry. The circuitry is configured to obtain a specific media content included in the received media stream from a second source.

16 Claims, 3 Drawing Sheets

(56) References Cited

U.S. PATENT DOCUMENTS

| | | |
|---|---|---|
| 2005/0153650 A1 | 7/2005 | Hikomoto |
| 2006/0114763 A1* | 6/2006 | Nakamae ......... G11B 20/10527 |
| | | 369/30.28 |
| 2006/0206582 A1 | 9/2006 | Finn |
| 2007/0098351 A1 | 5/2007 | East et al. |
| 2007/0293167 A1 | 12/2007 | Shridhar et al. |
| 2011/0138068 A1 | 6/2011 | van Oldenborgh et al. |
| 2011/0296482 A1* | 12/2011 | Melsen ................. H04L 47/745 |
| | | 725/109 |
| 2013/0279700 A1 | 10/2013 | Whitecar et al. |
| 2013/0343547 A1 | 12/2013 | Pahuja et al. |
| 2014/0195643 A1* | 7/2014 | Liu .................. H04N 21/23109 |
| | | 709/217 |
| 2015/0195315 A1 | 7/2015 | Kidron |
| 2015/0347515 A1 | 12/2015 | Callender et al. |
| 2016/0157209 A1* | 6/2016 | Baldwin ............ H04N 21/6131 |
| | | 370/216 |

* cited by examiner

APPARATUS AND METHOD FOR PLAYING BACK MEDIA CONTENT FROM MULTIPLE SOURCES

CROSS-REFERENCE TO RELATED APPLICATIONS

This application is a National Stage Application based on PCT/EP2017/059768, filed Apr. 25, 2017, and claims priority to European Patent Application 16167364.5 filed by the European Patent Office on 27 Apr. 2016, the entire contents of which being incorporated herein by reference.

TECHNICAL FIELD

The present disclosure generally pertains to an apparatus and method for playing back media content.

TECHNICAL BACKGROUND

It is known to broadcast media content, such as audio or video content, for example, from a broadcast station and to receive this content at a receiving end, e.g. a radio tuner, television or the like.

Broadcast media content may have a degraded quality, such that a user receiving such degraded content may not have an optimal consumer experience.

Hence, it is generally desirable to improve the quality of playback of media content.

SUMMARY

According to a first aspect, the disclosure provides an apparatus comprising: a receiver configured to receive a media stream from a broadcast source; and a circuitry configured to obtain a specific media content included in the received media stream from a second source.

According to a second aspect, the disclosure provides a method comprising receiving a media stream from a broadcast source; and obtaining a specific media content included in the received media stream from a second source.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
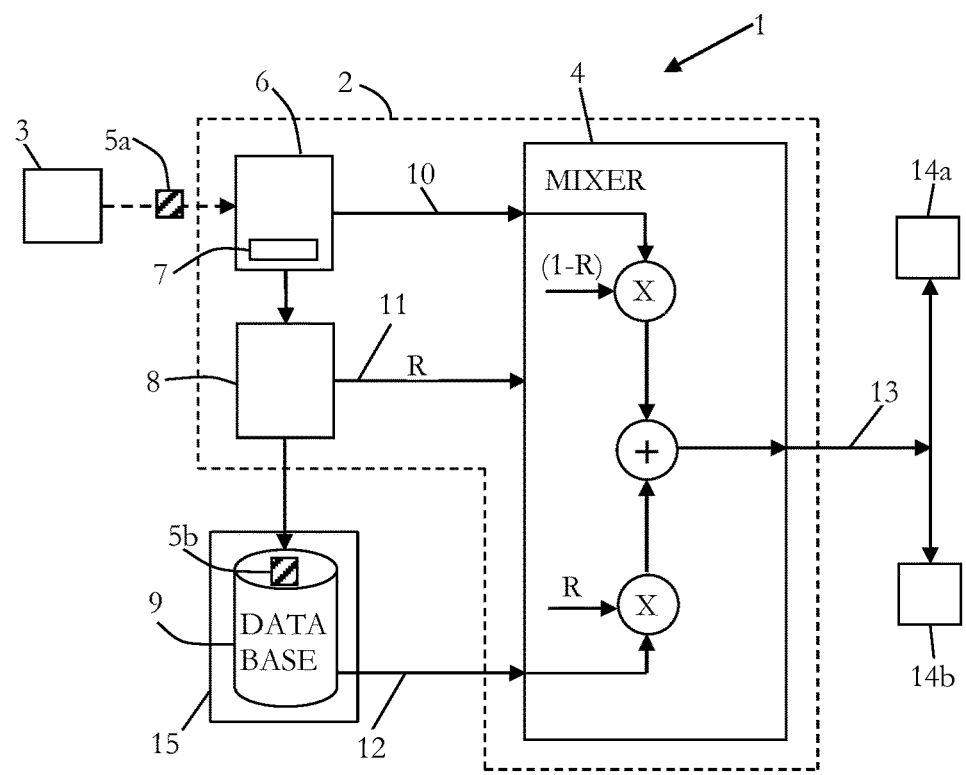
FIG. 1 illustrates a first embodiment of an apparatus in accordance with the present disclosure.

Before describing the embodiments of the present disclosure under reference of FIG. 1 in detail, general explanations are made.

As mentioned in the outset, media content, e.g. audio or video content, can be broadcasted by a broadcast station, e.g. a radio station, television transmitter, or the like. Such media content may be broadcasted over the air, via cable, via a network, via the internet or via other transmission media or transmission channels.

However, media content may have a low or degraded quality for different reasons. For instance, the quality of the media content itself might be low, e.g. since it is based on compressed data, such as MP3, MPEG or the like. Another reason might be that the communication channel over which the media content is broadcast might be disturbed, for example, due to specific weather or environment conditions in cases where the media content is broadcast over the air, or due to transmission problems in a network, etc.

Some embodiments pertain to an apparatus, e.g. an electronic device, electronic portable device, computer, laptop, tablet computer, portable music player, mobile phone, television receiver, radio receiver (portable, integrated in a car, or the like), navigation system, home entertainment system, high fidelity player, etc. The apparatus may also be a part of the device or of a home entertainment system (TV, Hifi), of a mobile entertainment device, e.g. mobile phone or portable music player, or could be part of or integrated in a car entertainment system.

The apparatus includes a receiver configured to receive a media stream from broadcast source. The broadcast source may broadcast the media stream via a specific transmission or communication channel. The broadcast source may provide media content with a first quality. The receiver may be implemented in hardware or software.

The receiver may be a radio receiver, a television receiver or the like, and, thus, capable of receiving electromagnetic waves over the air, transmission signals over a cable, or the like. The receiver may also be capable of receiving the media stream as data over a data network, the internet or the like.

The media stream may be broadcasted, as mentioned above, by a broadcast station (radio, television station or the like), an internet server, etc., which are possible broadcast sources and which are, in principle, possible second sources, which are discussed further below. The media stream may be a live stream which is broadcast by the broadcast source.

The apparatus includes a circuitry configured to obtain a specific media content included in the received media stream from a second source.

The second source can be any type of source which is able to provide media content, e.g. a broadcast station (radio, television station or the like), an internet server, any type of storage media, e.g. compact disc, digital video disc, magnetic tape, hard disk, solid state drive, any kind of volatile or non-volatile memory, etc. The second source may also be a database, which is stored on a respective storage.

The obtaining of the specific media content includes also receiving of the specific media content, download it, loading it into a memory or storage, etc. The specific media content may be obtained from the second source over any type of communication channel including, for example, over the air, over network, over internet, over a wireless network, over an internal bus from a storage (hard disk, compact disk, digital video disk, solid state drive, etc.), etc.

In some embodiments, the circuitry is configured to initiate a search for a specific media content included in the received media stream to be received or obtained from a second source. The broadcast source may provide media content with a first quality, it may be different from the second source and the second source may provide media content with a second quality, wherein the second quality is higher than the first quality.

In some embodiments, it is determined that a broadcast source has a first quality which is lower than the second quality of the second source, without analyzing the actual quality, for example, of the specific media content. In other words, in some embodiments it is assumed that a specific first or broadcast source has a certain (first) quality.

The obtaining of and/or the searching for the specific media content may including using, for example, a search algorithm, as it is oftentimes part of an operating system, using an internet search machine or the like. In some embodiments the search is done by sending a query to a respective database and then the specific media content is obtained. The search may be done on the basis of a name, artist, or other information which is indicative of the specific media content and then the specific media content is obtained. As will be further discussed below, in some embodiments, a fingerprint of the specific media content may be used for obtaining the specific media content. In some embodiments, information about a specific media content included in the media stream will be provided by the broadcast source, e.g. a broadcast station. For instance, some broadcasters may broadcast additional information with the media stream, for example about the radio program and the current specific media content (titles of songs, news, or the like). This additional information may be radio text or the like, which can be transmitted in accordance with the radio data system standard (RDS standard). In other embodiments, for example, information about a current movie, show, or the like is transmitted by a television station in the form of an electronic program guide (EPG) in accordance with the EPG standard. Thereby, respective information of the current broadcasted specific media content is available and can be used as search criteria for obtaining the specific media content.

The circuitry may be implemented in hardware, in software or in a mixture of hardware and software in order to provide the functions as described herein. The circuitry can include one or more multipurpose processors and/or other types of electronic circuits, such as buffer, memory, amplifier, etc.

The apparatus may also include, for example, a display for displaying video content, speakers for outputting audio content, or any other type of output device for outputting the received specific media content and/or media content which has been found during the search.

Hence, by searching for the specific media content which is received, an identical or similar version of the specific media content may be found which is provided by the second source and which may have a better quality than the specific media content which is received from the broadcast station.

Thus, in some embodiments, a user using the apparatus can receive the best possible playback quality of current preferred or broadcasted media content, provided a better quality version of the media content can be found.

In some embodiments the circuitry is further configured to generate a fingerprint of the specific media content.

A fingerprint of audio content can be generated, for example, on the basis of an audio signal. It includes the generation of a digital summary on the basis of the audio signal, wherein the digital summary is generated in a predefined manner. For generation of an audio or acoustic fingerprint known audio fingerprint algorithms can be implemented, for example, TRM, AudioID, echoprint, AcoustID, or the like.

A fingerprint of video content can be generated, for example, on the basis of characteristic components of a video signal or video data. Video fingerprinting may be implemented, based on respective video fingerprinting algorithms, which are based, for example, on the analysis of visual characteristic components of the video, e.g. key frame analysis, color, motion changes during a video sequence or the like.

The fingerprint may be unique for a specific media content, such as a specific song, movie, or the like.

In some embodiments, the search for and/or the obtaining of the specific media content is based on the fingerprint. This may be done with the help of a database, which includes multiple audio and/or video files each one of the files being associated with a respective fingerprint which is unique for a specific audio and video file, respectively.

In some embodiments, the search for the specific media content is based on a similarity search.

The broadcast media stream may be received over a first or broadcast communication channel and the specific media content may be obtained from the second source over a second communication channel. The second communication channel may be different from the first communication channel. In such cases, when, for example, the first communication channel is disturbed, the respective disturbance may not be present in the second communication channel. Thus, by obtaining the specific media content over the second communication channel, the disturbance of the first communication channel may be circumvented. The first and second communication channels, may include, as mentioned above, transmission over the air, over a cable, over a network, etc.

In some embodiments, the circuitry is further configured to calculate a reliability measure on the basis of the specific media content received and the media content found obtained (and, for example, found in search performed).

The reliability measure may be based, for example, on assessing the degree of agreement between the specific media content received and the media content obtained. In some embodiments, the specific media content received and the media content obtained are not directly compared to each other, but indirectly, for example, by comparing the respective fingerprints to each other or other information which is indicative of the specific media content received and the media content obtained. The reliability measure may be such constructed that it can adopt values between 0 and 1, wherein a reliability measure of zero results in fully playing back the specific media content received and a reliability measure of one results in fully playing back the media content as obtained. In other words, the reliability measure of zero means in some embodiments that the specific media content received and the media content obtained are not identical or not similar enough, while the reliability measure of one means in some embodiments that the specific media content received and the media content obtained are identical or similar versions of the media content.

In some embodiments, the circuitry is further configured to mix the specific media content received and the media content obtained on the basis of the reliability measure. This mixture may be used also for blending over from the specific media content which is currently played back and the media content which has been obtained, in order to provide a smooth transition from the playback of the specific media content received and the playback of the media content obtained. As discussed, the reliability measure R may adopt only values from 0 to 1 in some embodiments. By multiplying the specific media content received with the term "one minus R" (i.e. (1−R)) and multiplying the content media found obtained with "R" and adding both together, a so-called alpha blending between the specific media content received and the media content obtained may be realized.

In some embodiments, the reliability measure is periodically or even continuously calculated during receipt of the media stream or during the receipt of the specific media content and/or during obtaining of the specific media content from the second source.

The circuitry may be further configured to play back the received specific media content and identify a current playback position of the specific media content. As mentioned above, the specific media content may be played back via a display, speakers or any other output means. By identifying the current playback position of the specific media content it is possible to start playback of the media content obtained such that a seamless switch over between the specific media content currently played back and the media content obtained is feasible.

The circuitry may be further configured to receive a playlist from the broadcast source, the playlist indicating the order and time of media content to be broadcasted by the broadcast source. By receiving the playlist, the apparatus has the information in advance, when, i.e. at which point in time, a specific media content will be broadcasted by the broadcast source. Hence, media content can be searched for and obtained in advance, before the playback is started and, for example, downloaded from the internet or a database or other type of second source as mentioned above and may be stored in a storage (hard disk, solid state drive or the like).

Hence, the circuitry may be further configured to search for and/or to obtain the media content indicated in the playlist.

As mentioned above, the circuitry may be configured to search for the specific media content in a database and to obtain it accordingly. The database can be a remote database or a local database. The remote database may be reachable over a network connection, the internet or the like. The local database may be located in a storage of the apparatus, such as a hard disk, a solid state drive, a compact disk, a digital video disk or the like.

As also indicated above, in some embodiments, the circuitry is further configured to replace the specific media content received from the broadcast source with the specific media content obtained from the second source. Thereby, media content obtained from the second source and having a higher quality than the media content received from the broadcast source having a lower quality can be played back.

Some embodiments pertain to a method, which can be executed by the apparatus and its circuitry as described herein. Hence, the following method features are a repetition of the respective features which have already been described above for the apparatus, and, thus, all explanations made herein are applicable to the following respective features of the method.

The method includes receiving a broadcast media stream from a broadcast source. As discussed, the broadcast source may provide media content with a first quality. A specific media content included in the received media stream is obtained from a second source. The broadcast source may provide media content with a first quality and may be different from the second source. The second source may provide media content with a second quality, the second quality being higher than the first quality, as described above. The method may include generating a fingerprint of the specific media content received from the broadcast source. The obtaining of specific media content may be based on the fingerprint. The broadcast media stream may be received over a first communication channel and it may be obtained from the second source over a second communication channel, the second communication channel being different from the first communication channel. The method may include calculating a reliability measure on the basis of the specific media content received and the specific media content obtained from the second source. The method may further include mixing the specific media content received and the media content obtained from the second source on the basis of the reliability measure. The method may further include playing back the received specific media content and identifying a current playback position of the specific media content. The method may further include receiving a playlist from the broadcast source, the playlist indicating the order and time of media content to be broadcast by the broadcast source. The method may further include searching for and/or obtaining the media content indicated in the playlist. The method may further include searching for the specific media content in a database and obtaining it accordingly. The method may further include replacing the specific media content received from the broadcast source with the specific media content obtained from the second source.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 1, an embodiment of an apparatus 1 is illustrated. The apparatus 1 is depicted in this embodiment, without limiting the present disclosure in that regard, as a radio receiver.

The radio receiver 1 has a circuitry 2 and it receives from a radio station 3 (broadcast source) over the air a media stream with a specific media content 5a, in this example an original song 5a. The radio station 3, generally, sends media content with a low quality, for example, since audio data are compressed with a known compression algorithm, such as MP3, MPEG4, or the like. Moreover, as the radio station 3 broadcasts over the air, the radio transmission may be disturbed by weather phenomena or the like. Thus, in this embodiment, it is assumed that the quality of the original song 5a is low.

The circuitry 2 has a radio interface 6 which receives radio waves with the media stream and the original song 5a. The radio interface 6 may include typical electronic components, such as an antenna, a tuner, an amplifier and the like. The radio interface 6 converts the radio waves received into audio data which are buffered in a buffer 7.

Moreover, the radio data representing the original song 5a are fed to a processor 8 (or fingerprinting block) of the circuitry 2.

The processor 8 receives the audio data representing the original song 5a and calculates, as explicated above, a fingerprint of the original song 5a. Then, the processor 8 initiates a search on the basis of the fingerprint for the original song 5a by sending the fingerprint to a database 9.

The database 9 includes audio content having high quality, for example, audio data which is not compressed or which is compressed with an algorithm having a higher quality than, for example, MP3.

The database 9 has, for example, database entries where for each song or other audio file a respective fingerprint and further information, e.g. title, name of the artist(s), year of publication, album, length of the song, etc., is stored.

The database 9 is, in this embodiment, located at a local storage 15, which is a solid state drive in the present embodiment. The search in the database 9 yields a better quality version of the original song 5a, herein indicated as HQ (high quality) song 5b, and the better quality version is obtained.

In the present embodiment, the original song 5a and the HQ song 5b obtained are fed to a (blending) mixer 4. Moreover, the reliability measure R is provided from the processor 8 to the mixer. The mixer 4 then mixes the original song 5a and the HQ song 5b on the basis of the reliability measure R and outputs mixed audio data 13 which is provided to respective loudspeakers 14a and 14b. The mixing is accomplished by using a factor of (1−R) for the partition of the original song 5a and a factor of R for the partition of the HQ song 5b.

As mentioned above, the reliability measure R can adopt values between 0 and 1, wherein the value "0" means that no similarity is present between the original song 5a and the HQ song 5b and the value "1" means that the original song 5a and the HQ song 5b are identical or similar versions with respect to the content (not identical with respect to the quality).

In cases where, for example, the original song 5a is amended, e.g. by an overlaid voice, or where no HQ audio data file can be found, the similarity between the original song 5a and the HQ song 5b may decrease or drop down to "0".

Figure 2:
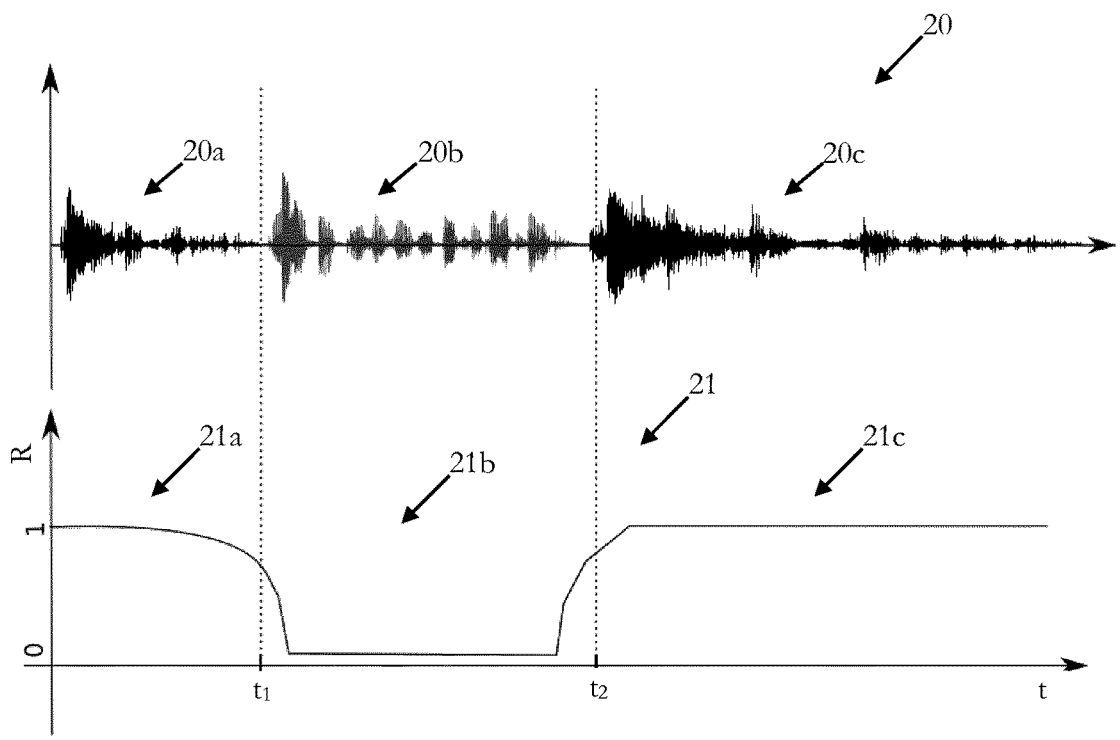
FIG. 2 illustrates an audio media stream.

Such a situation is visualized in FIG. 2. There, in an upper region, an audio stream 20 is shown as a waveform, which is segmented in three parts. In a first part of the audio stream 20, until a point of time "$t_1$", a first media content 20a, e.g. a song, is broadcasted. At the point of time "$t_1$", a second part 20b of the audio stream 20 starts, which represents the voice of a speaker announcing, for example, the next song, which starts at "$t_2$", where also the third segment of the audio stream 20 including a media content (song) 20c starts.

In a lower region of FIG. 2, a curve 21 is shown, representing reliability measure values "R". As can be taken from FIG. 2, the reliability measure R is equal to "1" in the region of 21a, as a respective HQ song 5b is found in the database 9 and obtained which is identical to the media content 20a of the first segment of the media stream 20. Hence, in this case, the mixer 4 outputs the obtained HQ song 5b.

Then, in the second region 21b of the curve 21, speech is present in the media stream 20 and, as no fitting media content can be found in the database 9, the reliability measure R drops down to (nearly) "0". Hence, here the mixer 4 outputs the original media stream 20, i.e. the speech waveform.

In the third region 21c the speech part of the media stream 20 is finished and a new song, i.e. media content 20c, is broadcasted for which a respective HQ song can be found in the database 9 and can be obtained accordingly, such that the reliability measure R goes up to "1" again and the mixer 4 outputs the HQ song obtained.

In the regions where the reliability measure drops down from one to zero (in the region of $t_1$) or goes up from zero to one (in the region of $t_2$) a blending over takes place between the HQ song obtained and the original song or original media content (in the region of $t_1$) broadcasted and between the original media content/song and the HQ version of the content/song.

Figure 3:
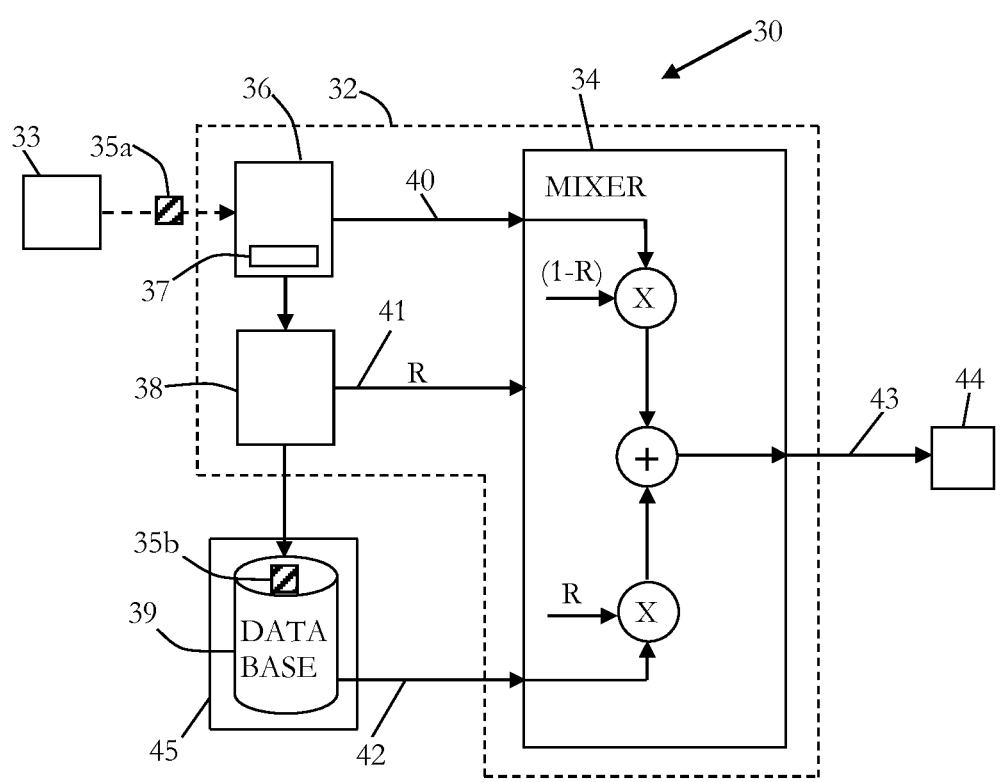
FIG. 3 illustrates a second embodiment of an apparatus in accordance with the present disclosure.

FIG. 3 illustrates an embodiment of an apparatus 30, which is similar to apparatus 1 in some detail, but which is configured for playing back video content, and the apparatus 30 is in this embodiment, without limiting the present disclosure in that regard, a television receiver.

The television receiver 30 has a circuitry 32 and it receives from a television station 33 (broadcast source) over the air or over a cable connection a media stream with a specific media content 35a, in this example an original movie 35a. The television station 33, generally, sends media content with a low quality, for example, since video data are compressed with a known compression algorithm, such as MPEG3, MPEG4, or the like. Moreover, in the case that the television station 33 broadcasts over the air, the television transmission may be disturbed by weather phenomena or the like. Thus, in this embodiment, it is assumed that the quality of the original movie 35a is low.

The circuitry 32 has a television interface 36 (e.g. TV tuner) which receives radio waves with the media stream, and the original movie 35a. The television interface 36 may include typical electronic components, such as an antenna, a television tuner, an amplifier and the like. The television interface 6 converts the radio waves received into video data which are buffered in a buffer 37.

Moreover, the television data representing the original movie 35a are fed to a processor 38 (or fingerprinting block) of the circuitry 32.

The processor 38 receives the video data representing the original movie 35a and calculates, as explicated above, a fingerprint of the original movie 35a. Then, the processor 38 initiates a search on the basis of the fingerprint for the original movie 35a by sending the fingerprint to a database 39.

The database 39 includes video content having high quality, for example, video data which is compressed with an algorithm having a higher quality than, for example, MPEG4.

The database 39 has, for example, database entries where for each movie or video/audio file a respective fingerprint and further information, e.g. title, name of director, producer, or actors, year of publication, production company, length of the movie, etc., is stored.

The database 39 is, in this embodiment, located at a local storage 45, which is a solid state drive in the present embodiment. The search in the database 39 yields a better quality version of the original movie 5a, herein indicated as HQ (high quality) movie 35b, which is obtained from the database 39 and the local storage 45, respectively.

In the present embodiment, the original movie 35a being broadcasted and the HQ movie 35b being obtained are fed to a (blending) mixer 34. Moreover, the reliability measure R is provided from the processor 38 to the mixer. The mixer 34 then mixes the original movie 35a and the HQ movie 35b on the basis of the reliability measure R and outputs mixed video data 43 which is provided to a respective display 44. The mixing is accomplished by using a factor of "(1−R)" for the partition of the original movie 35a and a factor of "R" for the partition of the HQ movie 35b obtained.

As mentioned above, the reliability measure R can adopt values between 0 and 1, wherein the value "0" means that no similarity is present between the original movie 35a and the HQ movie 35b and the value "1" means that the original movie 35a and the HQ movie 35b are identical with respect to the content (not identical with respect to the quality).

In cases where, for example, the original movie 35a is amended, e.g. by an overlaid advertisement, or where no HQ movie data file can be found, the similarity between the original movie 35a and the HQ movie 35b may decrease or drop down to "0".

Figure 4:
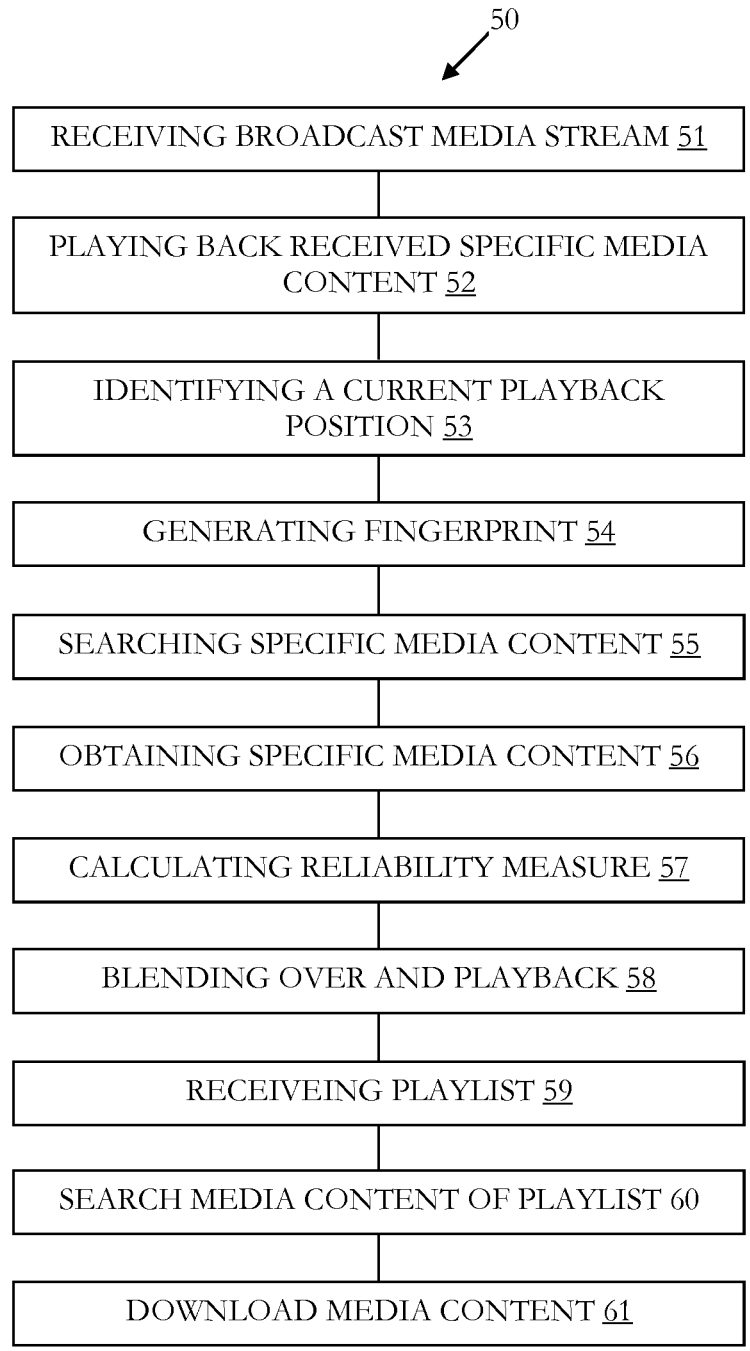
FIG. 4 illustrates a flow chart of a method in accordance with the present disclosure.

In the following, a method 50, which can be performed by apparatus 1 or apparatus 30, is described in the following under reference to FIG. 4.

The method 50 is mainly explained by the example of a radio transmission at home, without limiting the present disclosure in that regard. Moreover, differences for embodiments of the method 50 which pertain, e.g. to a television transmission, are indicated in the following description.

In the following it is exemplary assumed that a customer listens to a radio program with low quality, which is broadcasted by the radio station 3 of FIG. 1. In other words, the apparatus 1 receives at 51 a media stream (e.g. media stream 20 of FIG. 2) and outputs it via loudspeakers 14a and 14b by playing back the received media content included in the media stream at 52. In other embodiments, video data or television data may be received from a television station, such as television station 33 (FIG. 3), and is output on display, such as display 44 (FIG. 4) of apparatus 30.

The method 50 also (continuously) identifies at 53 a current playback position of the played back media content (audio or video content).

As discussed, generally, in the disclosure, audio fingerprinting or similarity search can be employed to find a matching song or video on another medium or transmission channel in a better quality.

In the present embodiment, the method 50 generates a fingerprint at 54.

The respective search algorithm searches for the media content currently played back at 55 by searching for the title and position of the currently played song/video and/or using the fingerprint as calculated at 54. If the song/video is found in the local song database, such as database 9 or database 39, with a higher quality, the algorithm will fade to the better signal in a smooth fashion. At 56, the media content found in the search is obtained. At 57 a reliability measure R is calculated which ranges from 0 to 1, as discussed above. If this reliability measure is 0, the original stream is played back at 58, if it has a value of 1 the higher quality song/video is played back at 58, as discussed above. Moreover, fading in and out of media contents or blending over between different media contents is accomplished on the basis of the reliability measure R at 58, as also discussed above.

In case some mixed material will be presented, for example, a voice which is simultaneously broadcasted with the song, or an advertisement which is displayed together with a movie, the reliability measure value R will decrease in embodiments, where the reliability measure is periodically or continuously re-calculated, for example, during playback of the obtained specific media content, and, thus, the method will switch to the original stream, as discussed above. In the case of audio content, the signal level of the original song is analyzed and aligned with the replacement song. By this means the fading process is hardly or not noticeable. As mentioned above, a buffer, such as buffer 7 or buffer 37, is used to allow a latency for the search algorithm searching for the high quality media content.

In some embodiments, there are provided two modes for handling speech over music, e.g. when the radio station announcer talks while the music is still playing: an "original" mode, where the radio program content is unchanged, a "music" mode, where any talking is suppressed while music is playing (as long as the respective high quality media content is available), and a "mixed" mode, where talking is suppressed, but traffic announcements are not (as they are marked clearly in the incoming stream, as also mentioned above).

If the song or other media content (e.g. video) cannot be found on the local storage media or database, the method 50 (or apparatus 1 above) can switch to any other type of stream, e.g. audio streaming over WLAN (wireless local area network), LAN (local area network), etc. In some embodiments a current CD playback is replayed with a higher resolution version of the respective media content on a local storage, e.g. hard disk or solid state drive or the like, or by web streaming over the internet or similar. Similarly, a version of a video content can be searched and played back which has a higher resolution as, e.g. the video on a digital video disc, Blu-ray Disc™ or the like. Of course, if neither a local version of the media content, nor a higher quality version of the media content from any other source can be found, the broadcasted media stream is played in its original version.

The system can further be extended by an automated download of media content which is known a priori. In this case a playlist of the songs or of videos or movies is known in advance, i.e. before it is broadcasted. The playlist can be provided by the broadcast station in advance, but, for example, it can also be provided by a user, it can be downloaded from an internet homepage or the like. The method 50 receives at 59 the playlist, searches at 60 for the media content included in the playlist and downloads at 61 the media contents of the playlist for obtaining it, i.e. the required audio or video files, and stores them off-line, if required, e.g. encrypted in order to address digital rights issues.

Then the broadcaster, such as radio station 3 or television station 33, may just transmit the start/stop and fade-in/fade-out information of the media content and will add the broadcaster's content like radio announcements, advertisement and the like. Thereby, the occupied bandwidth of the broadcast channel may be reduced in some embodiments.

It should be recognized that the embodiments describe methods with an exemplary ordering of method steps. The specific ordering of method steps is however given for illustrative purposes only and should not be construed as binding.

It is noted that the division of the circuitry 2 of FIG. 1 and circuitry 32 of FIG. 3 into receiver (6, 36), processor (8, 38), and mixer (4, 34) is only made for illustration purposes and that the present disclosure is not limited to any specific division of functions in specific units. For instance, the circuitry 2 of FIG. 1 and processor 38 of FIG. 3 could be implemented by a respective programmed processor, field programmable gate array (FPGA) and the like.

The method 50 described above, which can be used, for example, for controlling an electronic device, such as apparatus 1 of FIG. 1 or apparatus 30 of FIG. 3 discussed above, can also be implemented as a computer program causing a computer and/or a processor to perform the method, when being carried out on the computer and/or processor. In some embodiments, also a non-transitory computer-readable recording medium is provided that stores therein a computer program product, which, when executed by a processor causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using a software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An apparatus, comprising:
a receiver configured to receive a media stream from a broadcast source; and a circuitry configured to:
obtain a specific media content included in the received media stream from a second source.

(2) The apparatus of (1), wherein the broadcast source provides media content with a first quality, the broadcast source being different from the second source and the second source providing media content with a second quality, the second quality being higher than the first quality.

(3) The apparatus of (1) or (2), wherein the circuitry is further configured to generate a fingerprint of the specific media content received from the broadcast source.

(4) The apparatus of (3), wherein the specific media content is obtained based on the fingerprint.

(5) The apparatus of anyone of (1) to (4), wherein the media stream form the broadcast source is received over a first communication channel and wherein the specific media content is obtained from the second source over a second communication channel, the second communication channel being different from the first communication channel.

(6) The apparatus of anyone of (1) to (5), wherein the circuitry is further configured to calculate a reliability measure on the basis of the specific media content received from the broadcast source and the specific media content obtained from the second source.

(7) The apparatus of (6), wherein the circuitry is further configured to mix the specific media content received from the broadcast source and the specific media content obtained from the second source on the basis of the reliability measure.

(8) The apparatus of anyone of (1) to (7), wherein the circuitry is further configured to play back the specific media content received from the broadcast source and identify a current playback position of the specific media content.

(9) The apparatus of anyone of (1) to (8), wherein the circuitry is further configured to receive a playlist from the broadcast source, the playlist indicating the order and time of media content to be broadcasted by the broadcast source.

(10) The apparatus of (9), wherein the circuitry is configured to obtain the media content indicated in the playlist.

(11) The apparatus of anyone of (1) to (10), wherein the circuitry is further configured to replace the specific media content received from the broadcast source with the specific media content obtained from the second source.

(12) A method comprising:
receiving a media stream from a broadcast source; and
obtaining a specific media content included in the received media stream from a second source.

(13) The method of (12), wherein the broadcast source provides media content with a first quality, the broadcast source being different from the second source and the second source providing media content with a second quality, the second quality being higher than the first quality

(14) The method of (12) or (13), further comprising generating a fingerprint of the specific media content received from the broadcast source.

(15) The method of (13), wherein the obtaining of the specific media content is based on the fingerprint.

(16) The method of anyone of (12) to (15), wherein the media stream is received from the broadcast source over a first communication channel and wherein the specific media content is obtained from the second source over a second communication channel, the second communication channel being different from the first communication channel.

(17) The method of anyone of (12) to (16), further comprising calculating a reliability measure on the basis of the specific media content received from the broadcast source and the specific media content obtained from the second source.

(18) The method of (17), further comprising mixing the specific media content received from the broadcast source and the specific media content obtained from the second source on the basis of the reliability measure.

(19) The method of anyone of (12) to (18), further comprising playing back the received specific media content and identifying a current playback position of the specific media content.

(20) The method of anyone of (12) to (19), further comprising receiving a playlist from the broadcast source, the playlist indicating the order and time of media content to be broadcast by the broadcast source.

(21) The method of (20), wherein the media content indicated in the playlist is obtained.

(22) The method of anyone of (12) to (21), further comprising replacing the specific media content received from the broadcast source with the specific media content obtained from the second source.

(23) The method of anyone of (12) to (22), further comprising searching for the specific media content.

(24) A computer program comprising program code causing a computer to perform the method according to anyone of (12) to (23), when being carried out on a computer.

(25) A non-transitory computer-readable recording medium that stores therein a computer program product, which, when executed by a processor, causes the method according to anyone of (12) to (23) to be performed.

The invention claimed is:

1. An apparatus, comprising:
a receiver configured to receive a media stream having a first quality from a broadcast source; and
a circuitry configured to:
obtain a specific media content included in the received media stream from a second source different from the broadcast source, the media content provided by the second source having a second quality higher than the first quality;
calculate a reliability measure on the basis of a similarity of the specific media content received from the broadcast source and the specific media content obtained from the second source;
mix the specific media content received from the broadcast source and the specific media content obtained from the second source on the basis of the reliability measure; and
replace the specific media content received from the broadcast source with the specific media content obtained from the second source when the reliability measure has a first value.

2. The apparatus of claim 1, wherein the circuitry is further configured to generate a fingerprint of the specific media content received from the broadcast source.

3. The apparatus of claim 2, wherein the specific media content is obtained based on the fingerprint.

4. The apparatus of claim 1, wherein the media stream from the broadcast source is received over a first communication channel and wherein the specific media content is obtained from the second source over a second communication channel, the second communication channel being different from the first communication channel.

5. The apparatus of claim 1, wherein the circuitry is further configured to play back the specific media content received from the broadcast source and identify a current playback position of the specific media content.

6. The apparatus of claim 1, wherein the circuitry is further configured to receive a playlist from the broadcast source, the playlist indicating the order and time of media content to be broadcasted by the broadcast source.

7. The apparatus of claim 6, wherein the circuitry is configured to obtain the media content indicated in the playlist.

8. The apparatus of claim 1, wherein the circuitry is further configured not to replace the specific media content received from the broadcast source with the specific media content obtained from the second source when the reliability measure has a second value different from the first value.

9. A method comprising:
receiving a media stream having a first quality from a broadcast source; and
obtaining a specific media content included in the received media stream from a second source different from the broadcast source, the media content provided by the second source having a second quality higher than the first quality;
calculating a reliability measure on the basis of a similarity of the specific media content received from the broadcast source and the specific media content obtained from the second source;
mixing the specific media content received from the broadcast source and the specific media content obtained from the second source on the basis of the reliability measure; and
replacing the specific media content received from the broadcast source with the specific media content obtained from the second source when the reliability measure has a first value.

10. The method of claim 9, further comprising generating a fingerprint of the specific media content received from the broadcast source.

11. The method of claim 10, wherein the obtaining of the specific media content is based on the fingerprint.

12. The method of claim 9, wherein the media stream is received from the broadcast source over a first communication channel and wherein the specific media content is obtained from the second source over a second communication channel, the second communication channel being different from the first communication channel.

13. The method of claim 9, further comprising playing back the received specific media content and identifying a current playback position of the specific media content.

14. The method of claim 9, further comprising receiving a playlist from the broadcast source, the playlist indicating the order and time of media content to be broadcast by the broadcast source.

15. The method of claim 14, wherein the media content indicated in the playlist is obtained.

16. The method of claim 9, further comprising not replacing the specific media content received from the broadcast source with the specific media content obtained from the second source when the reliability measure has a second value different from the first value.

* * * * *